United States Patent [19]

Henson

[11] Patent Number: 4,525,272
[45] Date of Patent: Jun. 25, 1985

[54] ELECTROCHEMICAL IONIZATION SYSTEM FOR PURIFYING WATER

[75] Inventor: James H. Henson, Phoenix, Ariz.

[73] Assignee: Swimaid, Inc., Scottsdale, Ariz.

[21] Appl. No.: 581,823

[22] Filed: Feb. 21, 1984

[51] Int. Cl.³ .............................................. C02F 1/46
[52] U.S. Cl. .................................... 210/149; 210/192; 210/243; 204/228; 204/272
[58] Field of Search .............. 210/243, 748, 961, 149, 210/169, 192, 205; 204/228, 272, 275

[56] References Cited

U.S. PATENT DOCUMENTS

| | | | |
|---|---|---|---|
| 3,223,242 | 12/1965 | Murray | 210/192 X |
| 3,336,220 | 8/1967 | Neidl | 210/243 X |
| 3,841,483 | 10/1974 | Overton | 210/243 X |
| 4,004,994 | 1/1977 | Andrus | 204/272 X |
| 4,341,617 | 7/1982 | King | 204/272 X |
| 4,379,043 | 4/1983 | Chappelle | 204/272 X |

Primary Examiner—Thomas Wyse
Attorney, Agent, or Firm—Drummond & Nissle

[57] ABSTRACT

An improved water purification system. The system utilizes an electrolytic cell and maintains a generally constant current flow through the electrolytic cell when the electrical resistance of water being treated by the cell varies. The relationship between current flow through the electrolytic cell and the temperature of water moving through the cell can generally be represented in linear graphical form.

6 Claims, 6 Drawing Figures

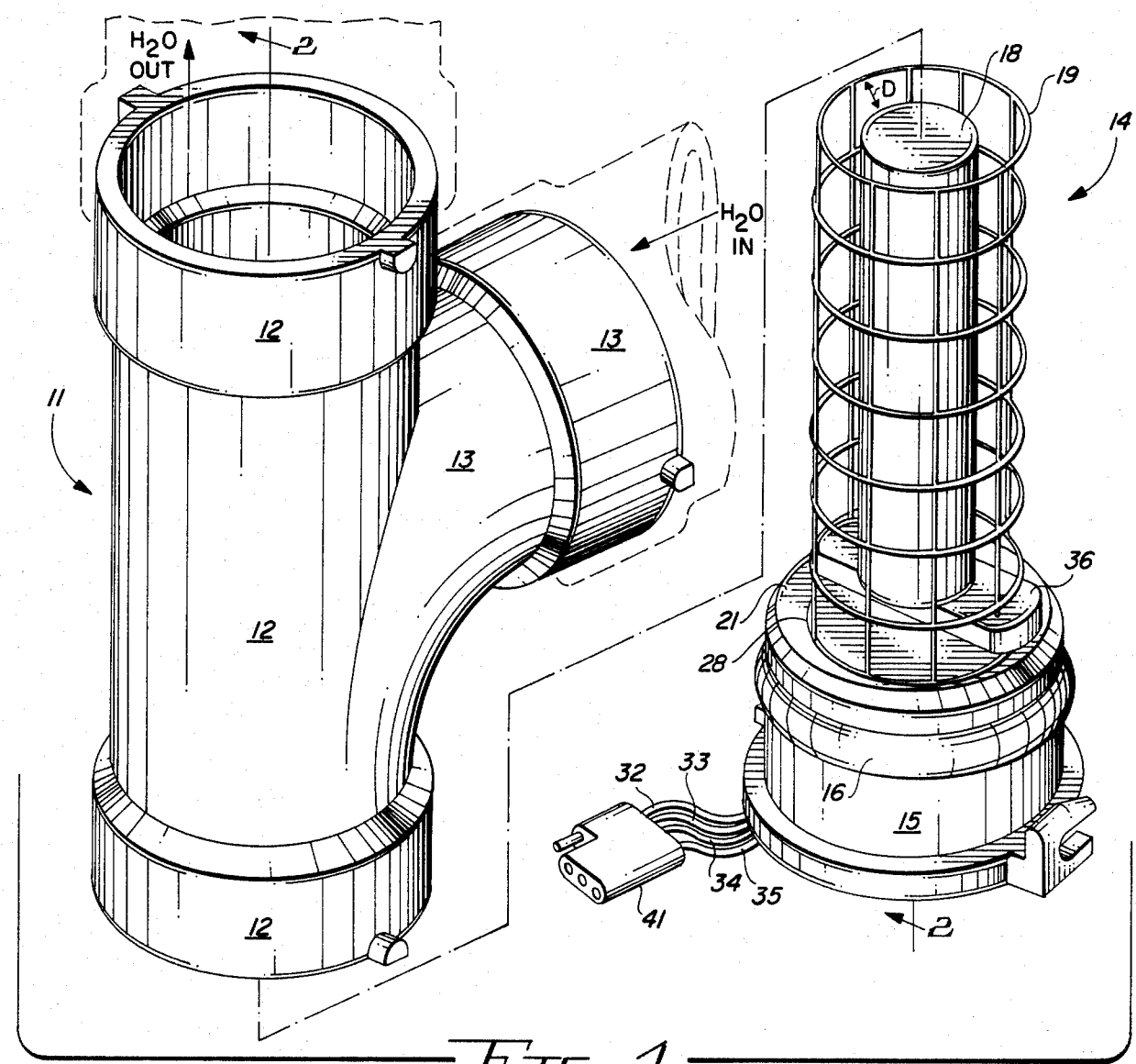
_Fig-1_
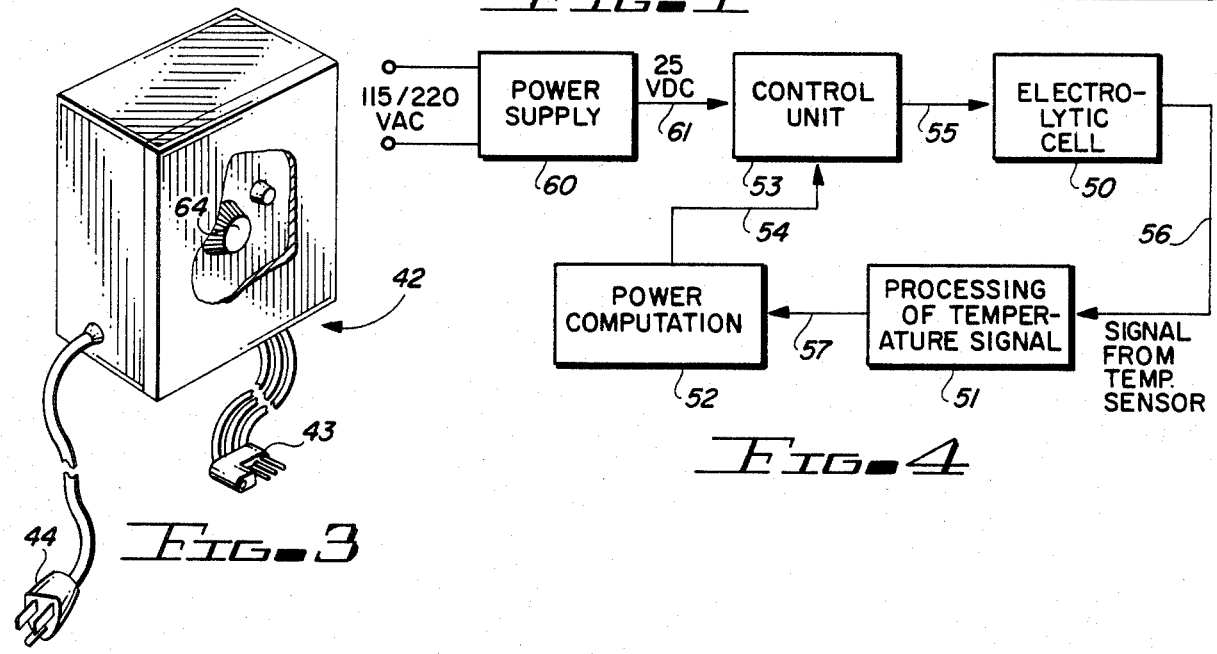
_Fig-3_
_Fig-4_

ELECTROCHEMICAL IONIZATION SYSTEM FOR PURIFYING WATER

This invention relates to apparatus for purifying water.

More particularly, the invention relates to electrolytic water purification apparatus which eliminates algae and bacteria from water while minimizing or eliminating the amount of chlorine or other toxic chemicals which normally must be used to disinfect the water.

In a further respect, the invention relates to an electrolytic cell which removes essentially all contaminating chemical elements from water to prevent the growth of algae in the water and which produces oxygen and a concentration of copper ions in the water to kill bacteria and algae in the water.

In another respect, the invention relates to electrolytic water purification apparatus which, in order to prevent the growth of algae and bacteria in water without adding chemical disinfectants thereto, accurately monitors the temperature and resistivity of the water and maintains a constant optimum selected amount of current flowing through water in the electrolytic cell when the resistivity of the water changes as the concentration of algae, bacteria and chemical elements in the water varies, the optimum current flow generally being determined in relation to the temperature of the water.

In still another respect, the invention pertains to an electrolytic cell which accurately monitors the temperature and electrical resistivity of water passing through the cell to insure a long operational life for electrodes comprising the electrolytic cell.

In yet a further respect, the invention pertains to electrolytic cell apparatus which efficiently purifies water passing through the apparatus by promoting the turbulent passage of water around and through the cathode of the cell and by therefore minimizing the likelihood of laminar flow of water through the apparatus.

In another important respect, the invention pertains to an electrolytic water purification cell which, when used to purify the water in a swimming pool, eliminates having to periodically drain and refill the swimming pool to remove calcium concentrations which have accumulated in the pool water.

In still another important respect, the invention pertains to electrolytic water purification apparatus which, when used to purify the water in a swimming pool, kills algae which have infested the tile grout and depressions and nitches in the walls of the pool, such algae infestations normally not being eliminated by conventional chlorine-acid pool treatments. Electrolytic water treatment apparatus is well known in the art. See for example, U.S. Pat. Nos. 4,385,973 to Reis et al., 4,257,352 to Habegger, 3,725,226 to Stone, 3,891,535 to Wikey, 4,361,471 to Kosarek, and 4,263,114 to Shindell. Such conventional electrolytic water treatment systems frequently are utilized to produce chlorine to kill and prevent the growth of algae and bacteria in water. An electrolytic cell which produces chlorine can readily be incorporated in conventional water purification systems for swimming pools. Such systems which appear to represent currently accepted procedures for disinfecting pool water, periodically add selected amounts of chlorine, acid and other chemicals to pool water. In warm climates where swimming pools are prevalent, hot summer temperatures accelerate the rate of growth of algae and bacteria in pool water and require that substantial sums of money be expended on chlorine and other chemicals used to purify pool water. Chlorine, even in relatively small concentrations, is an extremely sensitive toxic chemical. The eyes and skin of many individuals are extremely sensitive to chlorinated water. A further drawback of water treated with chlorine is that even when the concentration of chlorine in the water is relatively strong, algae still thrive in nitches in tile grout and in the sides and bottom of a pool. The growth of algae in nitches in the walls and tile grout of a pool accelerates the breakdown and disintegration of plaster utilized to form pool walls and tile grout.

Algae in pool water subsist on calcium and other minerals in the pool water while bacteria in the water subsist on the algae. When all contaminating minerals and elements are removed from water, algae in the water die, and, consequently, the bacteria which consume algae also die. A convenient procedure for purifying pool water without requiring the addition of chlorine and other chemicals to the water would therefore entail electrolytically producing very pure water. However, in order to electrolytically produce pool water of the requisite purity it is necessary to utilize electrodes properly shaped, contoured, and dimensioned from select metals and to carefully monitor and correlate the temperature, resistivity and other conditions of pool water so that the rate of algae and bacteria growth can be readily controlled without permitting rapid deterioration of the electrodes comprising the electrolytic cell due to the passage of excessive amounts of electricity through the cell, and, without permitting rapid growth and multiplication of algae and bacteria due to the passage of insufficient amounts of electricity through the cell. Prior art apparatus apparently has not identified the proper electrode materials and contour thereof and has not defined the control and monitoring apparatus necessary to accomplish the purification of water without permitting explosive algae and bacteria growth during warm daytime hours or without permitting the rapid degeneration of electrodes.

It is well known that a sufficient concentration of copper ions in water kills bacteria and algae. However, if a copper electrode is utilized in an electrolytic cell to introduce copper into water flowing through the cell and too great an amount of current is passed through the cell, the electrode rapidly degenerates, making the use of a copper electrode economically unfeasible.

Accordingly, it would be highly desirable to provide apparatus for purifying water which would kill algae and bacteria in the water without requiring the utilization of chlorine and other toxic chemical disinfectants in the water.

It would also be highly desirable too provide improved electrolytic water purification apparatus which had electrodes contoured and dimensioned and which was able to appropriately monitor and correlate water conditions such that electrolytic cell current flow could be maintained which would efficiently purify water passing through the cell while providing an extended operational life for the cell electrodes.

Therefore, it is a principal object of the invention to provide improved apparatus for purifying water.

Another object of the invention is to provide water purification apparatus which eliminates algae and bacteria from water without requiring that chlorine or other toxic chemicals be added to the water.

A further object of the instant invention is to provide electrolytic cell apparatus which removes all contaminating chemical elements from water to prevent growth of algae in the water and which produces oxygen and a concentration of copper ions in water to kill bacteria in the water.

Still another object of the invention is to provide improved electrolytic water purification apparatus which, in order to prevent the growth of algae and bacteria in water without adding chemical disinfectants thereto, is able to accurately monitor the temperature and resistivity of water and maintain a constant optimum current flow through water as the concentration of algae, bacteria and chemical elements in the water varies; the optimum amount of current flow being determined in relation to the temperature of the water.

These and other, further and more specific objects and advantages of the invention will be apparent to those skilled in the art from the following detailed description thereof, taken in conjunction with the drawings, in which:

FIG. 1 is a perspective assembly view illustrating electrolytic cell apparatus constructed in accordance with the principles of the invention;

FIG. 3 is a perspective view of the unit used to control the electrolytic cell of FIGS. 1 and 2;

FIG. 4 is a schematic diagram illustrating the operation of the electrolytic water purification system of the invention;

Briefly, in accordance with the invention, I provide improved apparatus for purifying water. The apparatus includes a housing; a pair of electrodes attached to and projecting into said housing, one of the electrodes being substantially composed of copper and the other of the electrodes being substantially composed of iron; conduit means in fluid communication with the housing for directing a flow of water into the housing between the electrodes when water is therebetween directed by the conduit means. The current flow between the electrodes causes oxygen to be produced at and elements in the water to plate out on the iron electrode, the removal of elements from the water depriving algae therein of a food source and the oxygen promoting the oxidation and decay of bacteria and algae in the water. The current flow between the electrodes causes the copper electrode to produce a concentration of copper ions in the water. The copper ions kill algae and bacteria in the water. The improved electrolytic water purification apparatus generally prevents algae and bacteria from growing in water without requiring chlorine or other chemical disinfectants be added to the water. The apparatus may include means for maintaining a selected flow of current between the electrodes for a particular temperature of water when the concentration of chemical elements, bacteria, algae and other foreign matter in the water varies and alters the electrical resistance of the water.

Figure 2:
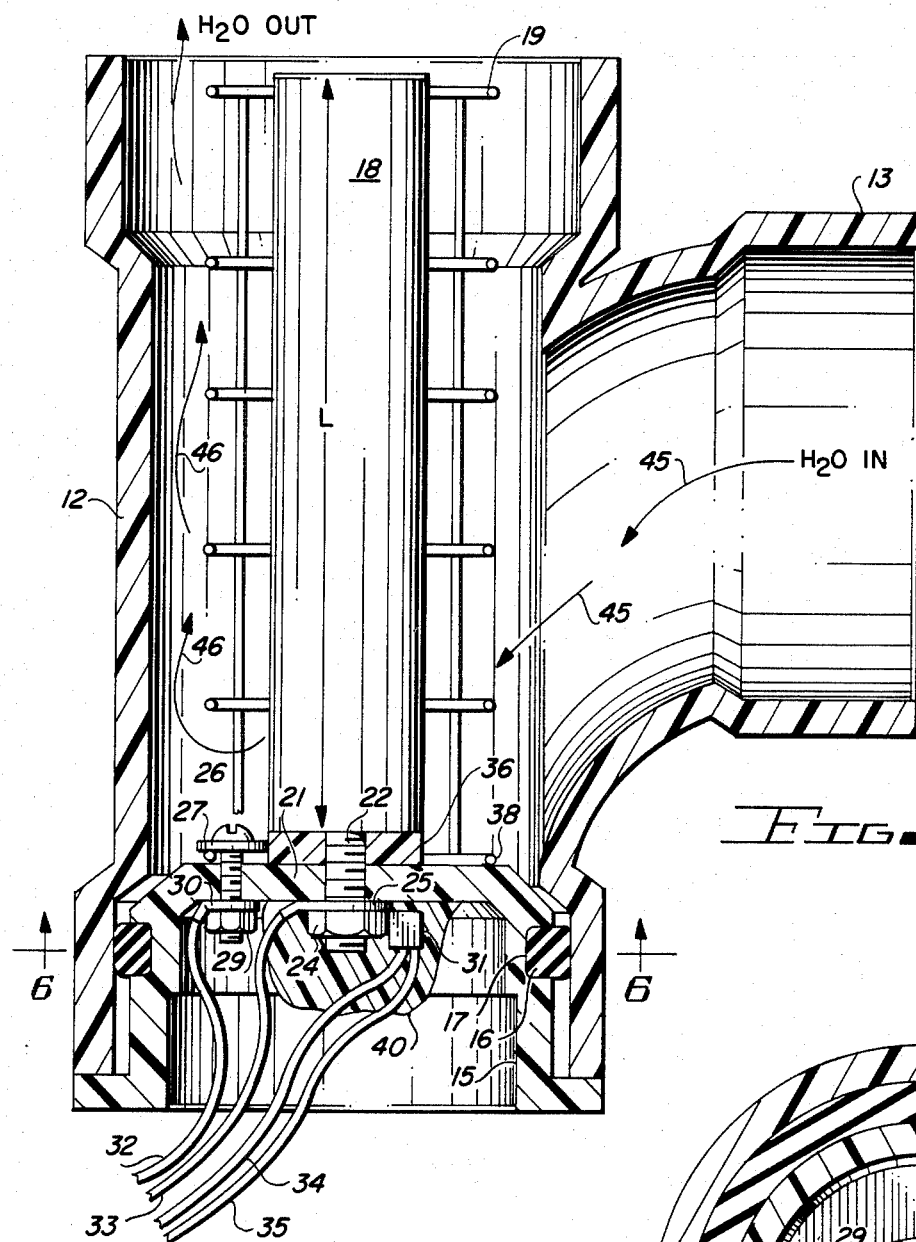
FIG. 2 is a section view of the electrolytic cell of FIG. 1 taken along section line 2—2 thereof and further illustrating interior construction details thereof.
Figure 6:
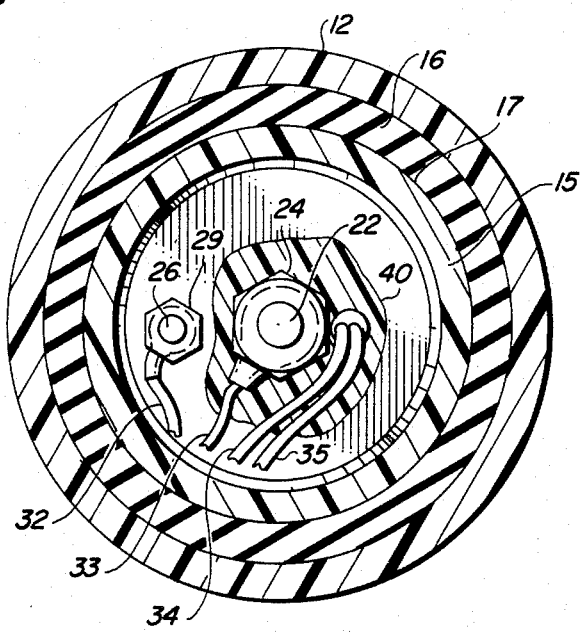

Turning now to the drawings, which depict the presently preferred embodiments of the invention for the purpose of illustrating the practice thereof and not by way of limitation of the scope of the invention, and in which like reference characters represent corresponding elements throughout the several views, FIGS. 1, 2, and 6 depict an electrolytic cell constructed in accordance with the principles of the invention and including a housing having a generally straight cylindrical portion 12 integrated with downwardly curved conduit member 13. Electrode unit 14 includes a base having a hollow cylindrical member 15 provided with O-ring seal 16 encircling member 15 in groove 17. Copper anode 18 and galvanized steel mesh screen 19 are secured to platform 21 of member 15. Anode 18 is connected to metal bolt 22 which passes downwardly through apertures formed in elongate member 36, platform 21 and metal washer 25 and is secured therein by nut 24. Cylindrical galvanized steel wire mesh screen 19 is secured to platform 21 by bolt 26 and nut 29 which clamp lower rung 28 of screen 19 against platform 21. The threaded neck bolt 26 passes through washer 27, through an aperture formed in platform 21 and through metal washer 30. Wires 32, 33 are connected to metal electrical contacts 30, 25, respectively. Potting material 40 maintains electrical temperature sensor 31 in contact with nut 24. Wires 34, 35 provide electrical current to temperature sensor 31. Wires 32-35 are connected to plug 41 which is attached to and receives electricity from plug 43 of control unit 42 (FIG. 3). Plug 44 of control unit 42 can be inserted in a conventional 115/220 AC voltage source.

In operation, water enters and flows through conduits 12, 13 generally as indicated by arrows 45, 46. Electricity flows through wires 33, 32 such that current passes from anode 18 to cathode 19 through water moving through housing 12. The water temperature is conducted through copper anode 18 and bolt 22 to nut 24. Since anode 18, bolt 22 and nut 24 are metal and readily conduct heat or cold, nut 24 accurately indicates the temperature of water passing through housing 11 of the electrolytic ionization unit, normally to within 0.2° F. Electrical sensor 31 contacting nut 24 monitors the temperature of water passing through housing 11. Signals 56 from sensor 31 of electrolytic cell 50 (FIG. 4) pass through wires 34, 35 to circuitry 51 which processes the signals 56 and feeds an adjusted and electronically "cleaned" signal 57 representing the water temperature to circuitry 52 which, based on temperature signal 57, calculates the amount of current which should be passing from anode 18 to cathode 19 through water in the cell. As will be explained, in order for the system of the invention to function efficiently, the amount of current passing through cell 50 should be carefully monitored and adjusted in relation to water temperature and to the electrical resistivity of the water.

Figure 5:
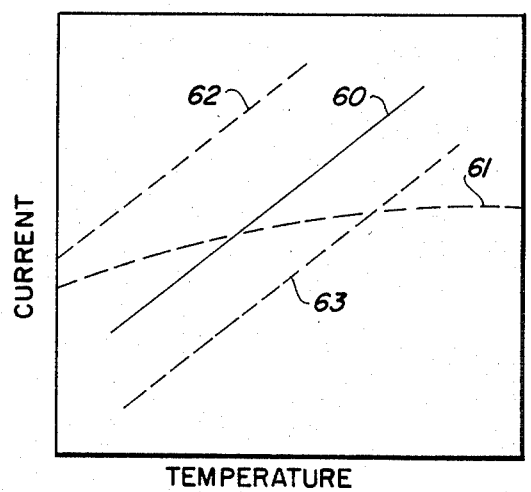
FIG. 5 is a graphical representation illustrating the optimum generally linear relationship between current passing through the electrolytic cell of FIGS. 1 and 2 and the temperature of water being purified by the cell; and, FIG. 6 is a bottom view of the electrolytic cell of FIGS. 1 and 2 further illustrating electrical connections therein.

Power computation circuitry 52 contains, for the particular water being treated wtih electrolytic cell 50, data which, when represented in the graphical form depicted by line 60 in FIG. 5, indicates the desired amount of current for a particular temperature of water. Thus, when circuitry 52 receives signal 57 indicating the temperature of the water from circuitry 51, circuitry 52 can readily calculate the desired current flow through cell 18 and transmit 54 this information to control unit circuitry 53 in control box 42 of FIG. 3. If the current flow 55 to cell 50 specified by circuitry 52 is less than or greater than the current flow 55 actually being delivered, control unit circuitry 53 appropriately adjusts current flow 55 to the level demanded by circuitry 52. Control unit circuitry 53 adjusts the amount of current passing through cell 50 by adjusting the voltage across wires 32, 33. Power supply 60 receives conventional 115/220 AC voltage and produces a twenty-five volt DC signal 61 which is directed to control unit circuitry 53.

The electrolytic cell of the invention is operated at the minimum voltage and current flow necessary to efficiently kill bacteria and algae in water purified by the cell. Although the voltage provided cell 50 (FIG. 4) by control unit 53 can vary from zero to twenty-five volts, the voltage supplied cell 50 is, when the cell is used to purify water in a 20,000 gallon swimming pool, normally in the range of one-half to six volts DC. Six volts DC produces a current of approximately one-half amp. Under typical operating conditions cell 50, after being used on a 20,000 gallon swimming pool for a period of thirty days, produces eighty to ninety percent pure water. The concentration of copper in purified water leaving cell 50 is preferably 0.05 to 0.20 ppm (parts per million) Cu. When this concentration of copper is achieved and sufficient current passes from anode 18 to cathode 19, the large majority of algae and bacteria in pool water are killed. Oxygen produced at wire mesh cathode 19 promotes the decomposition and oxidation of bacteria in the water while the plating out on cathode 19 of elements carried in the water deprives bacteria and algae of their food supply.

As indicated in FIG. 5, the optimum current-temperature relationship for a particular water composition can, in utilizing the apparatus of the invention, usually be reflected in linear graphical form 60. As the type of water being treated varies, for instance some waters are harder than others or have greater or lesser concentrations of other chemical and organic contaminants, both the slope and vertical position of the optimum current-water temperature line 60 in the graph of FIG. 5 can vary. For example, one type of water could have a optimum current-temperature relationship represented by dashed line 61 in FIG. 5, while other water compositions could have current-temperature lines represented by dashed lines 62, 63.

The optimum current-temperature line for a particular water composition is experimentally determined. The objective in determining the optimum current-temperature line is, under normal operating conditions, to generally define the minimal current flow between anode 18 and cathode 19 necessary to inhibit bacteria and algae growth when the water is any of a plurality of temperatures. Definition of what constitutes normal operating conditions depends on the water system the electrolytic apparatus of the invention is being utilized with. For example, when cell 50 is used on a swimming pool, predictable amounts of dirt and other matter contaminate the water daily, and the amount of current passing through cell 50 is set to compensate for such influxes of bacteria laden material. On the other hand, if a large amount of rain or dirt enters the pool's water, this would overload the electrolytic cell and it is expected that minor amounts of chlorine and other chemicals would be added to pool water to assist the electrolytic cell in dissipating the overload of bacteria and mineral elements in the pool water.

If too much current passes between anode 18 and cathod 19 for a water composition having a particular temperature and contaminant level, then excessive amounts of copper ions (anode) and oxygen (cathode) are produced and the anode and cathode tend to rapidly deteriorate. If insufficient current passes between anode 18 and cathode 19 insufficient amounts of copper ions had oxygen are produced, elements are not removed from the water quickly enough or in great enough amounts, and a sufficient number of bacteria are not "electrocuted" by current, passing through water from the anode 18 to cathode 19.

For the convenience of swimming pool owners, control unit 42 of FIG. 3 includes dial 43 which controls a variable potentiometer. When dial 43 is turned in a clockwise direction to the right, a current-temperature line 60 is adjusted upwardly in the direction of line 62. When knob 43 is turned in a counterclockwise direction to the left, a current-temperature line 60 is adjusted downwardly in the direction of line 63. Turning knob 43 does not vary the slope of line 60. However, in the presently preferred embodiment of the invention, the slope of a current-temperature line 60 can be adjusted by simply replacing a particular resistor in the electronic circuitry of unit 42. Thus unit 42 can be readily adapted to control cell 50 when different water compositions are being passed through cell 50.

Anode 18 is substantially comprised of copper and, to minimize power consumption, should be at least 50% copper by weight, although 90–95% copper by weight is preferred. If desired, 0.01 to 2.0 weight percent silver may be included in copper anode 18. While a small concentration of copper ions in water kills most algae and bacteria, silver, which will not kill algae, assists in killing bacteria.

Cathode 19 is substantially comprised of iron and is usually at least 50% iron by weight, with galvanized steel wire mesh being preferred. Galvanized steel cathode 19 produces oxygen and plates out the elements of the periodic table thereon. The zinc plating makes the steel corrosion resistant.

The use of galvanized steel wire mesh is an important feature of the invention. The mesh provides substantial surface contact area between the steel and water and also facilitates turbulent intermixing of water as it passes through the electrolytic cell. As indicated by arrows 45, 46 in FIG. 2, water passing through housing 11 makes nearly two passes along the length of anode 18. Water entering conduit 13 is directed downwardly toward platform member 21 and then travels upwardly through conduit 12 in the direction of arrows 46. The change of direction of water flow from that indicated by arrows 45 to the direction indicated by arrows 46 contributes to the turbulent mixing of water as it passes through the electrolytic cell. Such turbulent mixing is desired because it increases the volume of water which passes between anode 18 and cathode 19 and which comes into direct contact with cathode 19. Passage of water between anode 18 and cathode 19 is desirable because bacteria in the water must pass between anode 18 and cathode 19 to have their electropotential stripped away by current passing from anode 18 to cathode 19. Stripping bacteria of their electropotential kills the bacteria. The turbulent mixing of water in the electrolytic cell of FIGS. 1 and 2 also functions to evenly distribute copper ions and oxygen throughout the water. If a cylindrical plate or tube were used for cathode 19 in place of steel mesh 19, the turbulent mixing described above would not be obtained and there would instead essentially be laminar flow of water between and over solid cylindrical anode 18 and hollow cylindrical cathode plate 19.

For a particular water composition at a particular temperature it is preferred that the current indicated by an optimum current-temperature line 60 of the graph of FIG. 3 be maintained across anode 18 and cathode 19 when the resistivity of the water varies due to increases or decreases in bacteria or other contaminants in the water. Maintaining a generally constant current flow between anode 18 and cathode 19 when the resistivity of the water varies is important because such maintenance of constant current flow for a particular temperature water adheres to the current-temperature line 60 for the water being treated and generally seems to insure that algae and bacteria will be killed at the rate necessary to maintain the purity of the water at an acceptable level. Consequently, one of the primary functions of control unit 53 is to continuously electronically monitor the amount of current passing through electrolytic cell 50 at any particular instant in time, to compare such current flow with that mandated by the current-temperature line 60 of FIG. 5, and, if the current passing through cell 50 is too high or low, to appropriately increase or decrease the current by adjusting the voltage applied across anode 18 and cathode 19. In the presently preferred embodiment of the invention control unit 53 performs this function automatically. As would be appreciated by those of skill in the art, the electronic components and equipment necessary to construct a unit 53 to perform these functions and to construct circuitry 51, 52 is readily available and well known to those of ordinary skill in the microprocessor-electronics art.

The distance between the outer surface of anode 18 and cylindrical wire mesh 19 is indicated in FIG. 1 by arrow D. It is preferred this distance be approximately one-half inch and that the large majority of water passing through electrolytic cell 50 travel between cathode 19 and anode 18. When distance D is approximately one-half inch, bacteria in water between anode 18 and cathode 19 are effectively killed by current flowing through water between the anode and cathode. When distance D is greater than one-half inch, for instance, three to four inches, the efficiency of the system can markedly decrease.

Having described the invention in such terms as to enable those skilled in the art to which it pertains to understand and practice it, and having described the presently preferred embodiments thereof, I claim:

1. Apparatus for purifying water, said apparatus comprising
    (a) a hollow housing including a first end and a second end;
    (b) a platform member sealingly secured in said first end of said housing;
    (c) an anode attached to a base and projecting into said housing away from said platform member and said first end toward said second end of said housing, said anode being comprised substantially of copper;
    (d) a wire mesh cathode
        (i) attached to said platform member and projecting into said housing away from said platform member and said first end toward said second end of said housing,
        (ii) circumscribing and spaced apart from said anode,
        (iii) substantially composed of iron,
        said housing including a wall having an opening formed therethrough, said wall circumscribing said wire mesh cathode,
    (e) a conduit attached to said housing to direct a flow of water into said housing through said opening in said wall thereof such that water entering said housing from said conduit flows in a first direction of travel through said wire mesh cathode toward said anode and said platform member and is deflected away from said platform member and from said first end of said housing toward said second end of said housing in a second direction of travel, the change of direction of travel of water flowing through said housing from said first direction of travel to said second direction of travel causing turbulent intermixing of water passing through said housing to increase the volume of water passing between and contacting said anode and cathode;
    (f) means for causing current to flow between said anode and cathode when water from said conduit is flowing through said housing, said current flow causing
        (i) oxygen to be produced at and elements in the water to plate out on said iron electrode, the removal of elements from said water depriving algae therein of a food source and said oxygen promoting the oxidation and decay of bacteria and algae in the water,
        (ii) said copper electrode to produce a concentration of copper ions in the water, said copper ions killing algae and bacteria in the water.

2. The apparatus of claim 1 including control means for maintaining a generally constant selected flow of current between said anode and cathode for a particular tempeature of water flowing through said apparatus.

3. The apparatus of claim 2 wherein said control means maintains a generally constant selected flow of current between said anode and cathode when the electrical resistance of water flowing between said electrodes varies.

4. The apparatus of claim 3 wherein said first direction of travel of the water is at an acute angle with respect to said second direction of travel of said water.

5. The appartus of claim 4 wherein said current flow between said anode and cathode is produced by applying a voltage of 0.5 to 6.0 volts DC across said anode and cathode.

6. The apparatus of claim 5 wherein said cathode comprises galvanized steel.

* * * * *